3,502,709
METHOD FOR PRODUCING MALONONITRILE
Katsura Morita, Ikeda, and Naoto Hashimoto and Takahiro Saraie, Suita, Japan, assignors to Takeda Chemical Industries, Ltd., Osaka, Japan
No Drawing. Filed Sept. 5, 1967, Ser. No. 665,222
Claims priority, application Japan, Sept. 6, 1966, 41/59,068
Int. Cl. C07c *121/22*
U.S. Cl. 260—465.8      1 Claim

ABSTRACT OF THE DISCLOSURE

Malononitrile is produced in high yield by reacting gaseous ammonia with chlorocyanoacetylene dissolved in an inert organic solvent.

---

The present invention relates to a method for producing malononitrile.

Malononitrile is useful—owing to its high reactivity—as, for example, an intermediate in the industrial production of various chemical compounds, for example, purine bases, (e.g. adenine), pteridine bases (e.g. aminopterine), pyrimidine bases (e.g. vitamin $B_1$), etc.

Hitherto, malononitrile has been produced by a series of reaction steps, i.e. (a) reacting sodium cyanide with monochloroacetic acid, (b) converting the resulting cyanoacetic acid to its amide by way of its ester, and (c) dehydrating the cyanoacetic amide with a strong dehydrating agent such as phosphorus pentoxide or phosphorus oxychloride.

Moreover, the yield of the product is not always satisfactory from an industrial point of view.

Thus, it is a principal object of this invention to provide an industrially feasible method for producing malononitrile. According to the present invention, malononitrile can easily be produced at a low cost and in a high yield and, therefore, the process is advantageously used for the production of the said compound on a commercial scale.

Said object is realized by reacting ammonia with chlorocyanoacetylene dissolved in an inert organic solvent.

Chlorocyanoacetylene, the starting material in the present invention, is easily produced in a high yield, for example, by the pyrolysis of trichloropropionitrile or dichloroacrylonitrile.

The reaction of the present invention is carried out in an organic solvent which is inert to the starting material as well as to the product under the reaction conditions. Such a solvent is exemplified by aromatic hydrocarbons (e.g. benzene, toluene, xylene), lower alkyl esters (e.g. ethyl acetate, methyl acetate, diethyl carbonate), ethers (e.g. diethyl ether, dioxane, tetrahydrofuran) or a mixture thereof. Gaseous ammonia is introduced little by little into a solution of chlorocyanoacetylene in such an organic solvent as mentioned above. During the reaction vigorous agitation of the reaction mixture is recommendable. As the reaction proceeds, ammonium chloride, by-product, usually separates out of the solution, and is easily separated from the latter, from which malononitrile is easily recovered e.g. by distillation. The reaction temperature is suitably selected depending on the solvent employed. The reaction is usually carried out at from about $-20°$ C. to about $80°$ C.; and advantageously from about $20°$ C. to about $50°$ C.

The following examples show presently preferred embodiments of this invention but are not to be construed as restrictive. It is to be understood that the following examples are solely for the purpose of illustration and not for limitation of this invention, and that variations may be resorted to without departing from the spirit and scope of this invention. In the examples, parts by weight bear the same relation to parts by volume as do grams to milliliters.

EXAMPLE 1

10.1 parts by weight of chlorocyanoacetylene is dissolved in 120 parts by volume of acetonitrile. The solution is cooled to $-10°$ C., and 4.42 parts by weight of gaseous ammonia is introduced into the cooled solution under agitation, taking about half an hour. Then, ammonium chloride is filtered off. The filtrate is distilled to recover acetonitrile and the distillation is continued under reduced pressure to obtain 5.85 parts by weight of malononitrile. (Yield 75%.)

EXAMPLE 2

10.1 parts by weight of chlorocyanoacetylene is dissolved in 120 parts by volume of dioxane. The solution is cooled to $-15°$ C., and 4.02 parts by weight of gaseous ammonia is introduced into the cooled solution under agitation, taking about 45 minutes. Then, ammonium chloride is filtered off. The filtrate is distilled to recover ether and the distillation is continued under reduced pressure to obtain 5.53 parts by weight of malononitrile. (Yield 71%.)

EXAMPLE 3

10.7 parts by weight of chlorocyanoacetylene is dissolved in 300 parts by volume of benzene. To the solution there is added 4.25 parts by weight of gaseous ammonia taking 45 minutes under agitation, the temperature being kept at $50°$ C. After cooling, the reaction mixture is filtered to remove ammonium chloride. 7.45 parts by weight of malononitrile is obtained from the filtrate in a similar manner as in Example 1. (Yield 90%.)

What is claimed is:

1. A process for producing malononitrile, which comprises reacting ammonia with chlorocyanoacetylene in an inert organic solvent at a temperature of between about $-20°$ C. and about $80°$ C.

References Cited

UNITED STATES PATENTS

| | | | |
|---|---|---|---|
| 3,055,738 | 9/1962 | Krebaum | 260—465.8 XR |
| 3,070,622 | 12/1962 | Martin | 260—465.8 |
| 3,115,516 | 12/1963 | Martin | 260—465.8 XR |

JOSEPH P. BRUST, Primary Examiner

U.S. Cl. X.R.
260—465.7